United States Patent
Kita (10) Patent No.: US 6,542,637 B1
(45) Date of Patent: Apr. 1, 2003

(54) SYSTEM FOR DECIDING THE CONTENTS OF A PICTURE FRAME

(75) Inventor: Koji Kita, Wakayama (JP)

(73) Assignee: Noritsu Koki Co., Ltd., Wakayama (JP)

(*) Notice: Subject to any disclaimer, the term of this patent is extended or adjusted under 35 U.S.C. 154(b) by 0 days.

(21) Appl. No.: 09/321,571

(22) Filed: May 28, 1999

(30) Foreign Application Priority Data

May 29, 1998 (JP) .......................... 10-150325

(51) Int. Cl.[7] .............................. G06K 9/46; G06K 9/66
(52) U.S. Cl. ...................... 382/195; 382/272; 348/36
(58) Field of Search ........................... 382/195, 205, 382/272, 273; 348/36, 38, 42, 46, 50, 47, 218; 355/40

(56) References Cited

U.S. PATENT DOCUMENTS

| | | | | |
|---|---|---|---|---|
| 5,289,229 A | * | 2/1994 | Manico et al. ......... | 250/559.02 |
| 5,337,164 A | * | 8/1994 | Yabe et al. ................... | 348/96 |
| 5,383,035 A | * | 1/1995 | Suzuki ........................ | 355/40 |
| 5,448,377 A | * | 9/1995 | Kinoshita et al. ........... | 358/449 |
| 5,502,541 A | * | 3/1996 | Olliver ................... | 250/206.1 |
| 5,729,329 A | * | 3/1998 | Ajimu et al. ................. | 355/40 |
| 5,841,518 A | * | 11/1998 | Kajiwara ..................... | 355/38 |
| 6,049,371 A | * | 4/2000 | Manico et al. ................ | 355/41 |

FOREIGN PATENT DOCUMENTS

| | | |
|---|---|---|
| EP | 0601364 | 6/1994 |
| JP | 5323464 | 12/1993 |
| JP | 8304933 | 11/1996 |

\* cited by examiner

*Primary Examiner*—Samir Ahmed
*Assistant Examiner*—Anand Bhatnagar
(74) *Attorney, Agent, or Firm*—Smith Patent Office (57) ABSTRACT

An image scanning part scans, for example, a film with a CCD. Then it forms image data indicating an image on the film from the output of the CCD, and it outputs this image data to a computation control part. The computation control part inputs the image data from the image scanning part, temporarily memorizes this image data in an image memory, and based on the image data it decides whether a panoramic image is photographed in each picture frame. After a decision is made it then informs this decision result to a printing apparatus. The method and apparatus can also identify whether a plurality of picture frames of the film has a region with a predetermined density in a common location relative to the picture frames. The density of each picture frame can then be determined while excluding the region with the predetermined density in the common location of each of the plurality of picture frames.

10 Claims, 4 Drawing Sheets

SYSTEM FOR DECIDING THE CONTENTS OF A PICTURE FRAME

BACKGROUND OF THE INVENTION

1. Field of the Invention

The present invention relates to a picture frame decision apparatus and a method for determining the density of each picture frame on a film. More specifically, the present invention is particularly designed for deciding whether a panoramic image is photographed in a particular picture frame.

2. Discussion of the Related Art

It is known to decide whether a panoramic image is formed in a picture frame of a film by making a density decision for each picture frame on the film.

Figure 5:
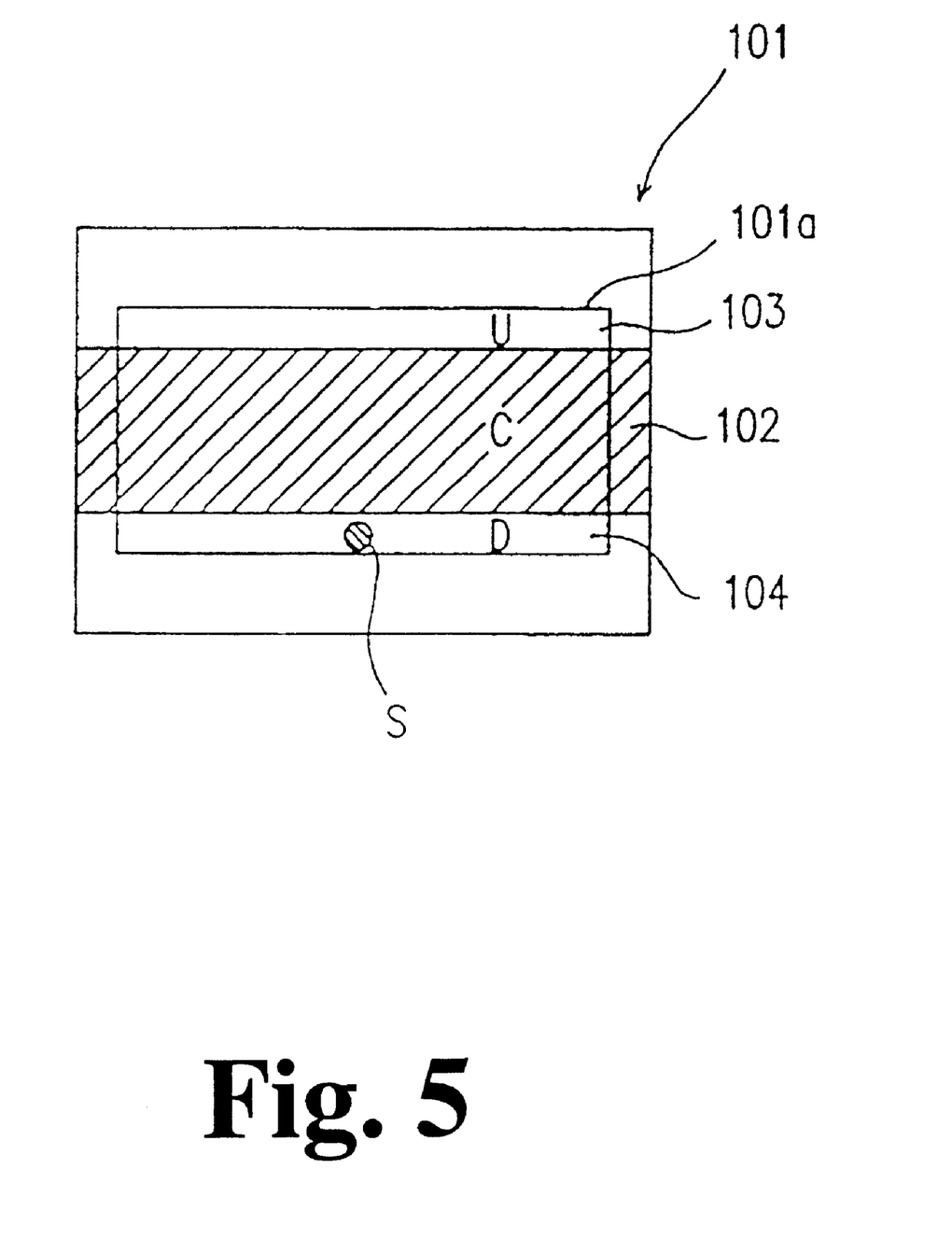
FIG. 5 is a diagram used in explaining a prior method of deciding whether a panoramic image is formed on a film.

For example, in a picture frame 101 as shown in FIG. 5, when a panoramic image is formed thereon, the image is photographed only in a panoramic area 102 indicated with oblique cross hatched lines but it is not photographed in other areas. If the picture frame 101 is subjected to a decision about whether the panoramic image is included thereon, an image part 101a (indicated with a solid line) is initially determined or cut out from the picture frame 101. From this image area 101a, a panoramic area 102 is then determined or cut out and then the average image density C of this panoramic area 102 is determined. Also, from the image part 101a, two panoramic naturally through areas 103 and 104 on both sides of the panoramic area 102 are determined or cut out. Then the average density U and D of these panoramic naturally through areas 103 and 104 is determined. Further, a base density A of a part of the film outside of the picture frame 101 is also determined.

Further herein, each density A, U, C and D is a transmission density. In other words, these densities indicate how much light transmits through the film. This procedure is also similar in the following description below.

After this, it is decided whether the following three conditions a–c are satisfied.

Condition a: The average image density C of the panoramic area 102 is sufficiently smaller (darker) than the average density U and D of panoramic naturally through areas 103 and 104.

Condition b: The difference between the average density U and D of panoramic naturally through areas 103 and 104 is sufficiently small.

Condition c: The average density U and D of the panoramic naturally through areas 103 and 104 are larger (lighter) than the base density A.

If these conditions were fully satisfied, it was decided that a panoramic image was formed in the picture frame 101 of the film.

However, if the picture frame 101 was very light due to under exposure of the picture frame 101 of the film or if the image photographed in the naturally through areas 103 and 104 was very small, the average density U and D of the naturally through areas 103 and 104 was sufficiently small. In this case, the above three conditions were satisfied and it was decided that a panoramic image was formed in the picture frame 101 and thus a false decision was made.

SUMMARY OF THE INVENTION

An object of the present invention is to solve the prior problem above and to provide a picture frame decision apparatus and method that allows an accurate decision to be made about whether a panoramic image is formed in the picture frame of a film.

For achieving the above object, a picture frame decision apparatus of one aspect of the present invention comprises identification means for identifying whether a plurality of picture frames of a film have a region with a predetermined density in a common location relative to each picture frame of the plurality of picture frames; and computation means for determining a density of each of the plurality of picture frames while excluding the region with the predetermined density in the common location relative to each picture frame of the plurality of picture frames.

A further aspect of the present invention comprises sectioning means for sectioning at least one picture frame into two naturally through areas and a panoramic area located therebetween; and decision means for deciding whether a panoramic image is formed in the at least one picture frame; wherein the computation means determines an average density of each of the naturally through areas while excluding the region with the predetermined density from each of the naturally through areas when the plurality of picture frames of the film have the region with the predetermined density at the common location relative to each picture frame of the plurality of picture frames, and wherein the decision means decides based on a comparison of the average density of the naturally through areas.

In an embodiment, the computation means determines a difference between a maximum density and a minimum density in each of the naturally through areas of the at least one picture frame, and wherein the decision means decides whether the panoramic image is formed based on a comparison of the average density of the naturally through areas and a comparison between a difference of each of the naturally through areas and a predetermined value.

A further aspect of the present invention comprises sectioning means for sectioning at least one picture frame into two naturally through areas and a panoramic area located therebetween; and decision means for deciding whether a panoramic image is formed in the at least one picture frame; wherein the computation means determines an average density of the panoramic image and an average density of each of the naturally through areas while excluding the region with the predetermined density from each of the naturally through areas when the plurality of picture frames of the film have the region with the predetermined density at the common location relative to each picture frame of the plurality of picture frames; and wherein the decision means decides based on a comparison of the average density of the naturally through areas and the average density of the panoramic area.

A further aspect of the present invention comprises sectioning means for sectioning at least one picture frame into two naturally through areas and a panoramic area located therebetween; and decision means for deciding whether a panoramic image is formed in the at least one picture frame; wherein the computation means determines a base density of the film, determines a standard density less than the base density with a predetermined ratio and determines an average density of each of the naturally through areas while excluding the region with a predetermined density from each of the naturally through areas when the plurality of picture frames of the film have the region with the predetermined density at the common location relative to each picture frame of the plurality of picture frames, and wherein the decision means decides based on a comparison between the standard density and the average density of the naturally through areas.

A further aspect of the present invention comprises sectioning means for sectioning at least one picture frame into two naturally through areas and a panoramic area located therebetween; and decision means for deciding whether a panoramic image is formed in the at least one picture frame; wherein the computation means determines a base density of the film, determines a standard density less than the base density with a predetermined ratio, determines an average density of the panoramic area and determines an average density of each of the naturally through areas while excluding the region with a predetermined density from each of the naturally through areas when the plurality of picture frames of the film have the region with the predetermined density at the common location relative to each picture frame of the plurality of picture frames, and wherein the decision means decides based on a comparison between the standard density and the average density of each of the naturally through areas and on a comparison between the average density of the panoramic area and the average density of each naturally through area.

In an embodiment, the identification means integrates a density of pixels located in the common location of the picture frames to obtain an integrated value and based on the integrated value, the identification means identifies whether a picture frame has the region with the predetermined density in the common location relative to each picture frame of the plurality of picture frames.

A picture frame decision method of one aspect of the present invention comprises identifying whether a plurality of picture frames of a film have a region with a predetermined density in a common location relative to each picture frame of the plurality of picture frames; and determining a density of each of the picture frames while excluding the region with the predetermined density in the common location relative to each picture frame of the plurality of picture frames.

A further aspect of the present invention comprises sectioning at least one picture frame into two naturally through areas and a panoramic area located therebetween; and deciding whether a panoramic image is formed in the at least one picture frame; wherein the step of determining the density includes determining an average density of each of the naturally through areas while excluding the region with the predetermined density from each of the naturally through areas when the plurality of picture frames of the film have the region with the predetermined density at the common location relative to each picture frame of the plurality of picture frames, and wherein the step of deciding whether a panoramic image includes comparing the average density of each of the naturally through areas.

In an embodiment, the step of determining the density includes determining a difference between a maximum density and a minimum density at each of the naturally through areas of the at least one picture frame, and wherein the step of deciding whether the panoramic image is formed includes comparing the average density of naturally through areas and comparing the difference of each of the naturally through areas and a predetermined value.

A further aspect of the present invention comprises sectioning at least one picture frame into two naturally through areas and a panoramic area located therebetween; and deciding whether a panoramic image is formed in the at least one picture frame; wherein the step of determining the density includes determining an average density of the panoramic image and an average density of each of the naturally through areas while excluding the region with the predetermined density from each of the naturally through areas when the plurality of picture frames of the film have the region with the predetermined density at the common location relative to each picture frame of the plurality of picture frames; and wherein the step of deciding whether a panoramic image is formed includes comparing the average density of the naturally through areas and the average density of the panoramic area.

A further aspect of the present invention comprises sectioning at least one picture frame into two naturally through areas and a panoramic area located therebetween; and deciding whether a panoramic image is formed in the at least one picture frame; wherein the step of determining the density includes determining a base density of the film, determining a standard density less than the base density with a predetermined ratio and determining an average density of each of the naturally through areas while excluding the region with a predetermined density from each of the naturally through areas when the plurality of picture frames of the film have the region with the predetermined density at the common location relative to each picture frame of the plurality of picture frames, and wherein the step of deciding whether a panoramic image is formed includes comparing the standard density and the average density of the naturally through areas.

A further aspect of the present invention comprises sectioning at least one picture frame into two naturally through areas and a panoramic area located therebetween; and deciding whether a panoramic image is formed in the at least one picture frame; wherein the step of determining the density includes determining a base density of the film, determining a standard density less than the base density with a predetermined ratio, determining an average density of the panoramic area and determining an average density of each of the naturally through areas while excluding the region with a predetermined density from each of the naturally through areas when the plurality of picture frames of the film have the region with the predetermined density at the common location relative to each picture frame of the plurality of picture frames, and wherein the step of deciding whether a panoramic image is formed includes comparing the standard density and the average density of the naturally through areas and comparing the average density of the panoramic area and the average density of each of the naturally through areas.

In an embodiment, the step of identifying includes integrating a density of pixels located in the common location of the picture frames to obtain an integrated value and identifying whether a picture frame has the region with the predetermined density in the common location relative to each picture frame of the plurality of picture frames.

According to this invention, identifying whether a plurality of picture frames of the film has the spot or region with a predetermined density at a common location of the picture frames, is done by determining the density of each picture frame while excluding the spot or region with the predetermined density in the common location of the picture frames. Thereby, the density of image can be determined while excluding the date or other marks photographed in the particular spot or region of the picture frame and then the density of picture frame can be accurately determined.

BRIEF DESCRIPTION OF THE DRAWINGS

The above and other objects and features of the present invention will be clearly understood from the following description with respect to preferred embodiments thereof when considered in conjunction with the accompanying drawings, wherein the same reference numerals have been used to denote the same or similar parts or elements, and in which.

DETAILED DESCRIPTION OF THE PREFERRED EMBODIMENTS

Figure 1:
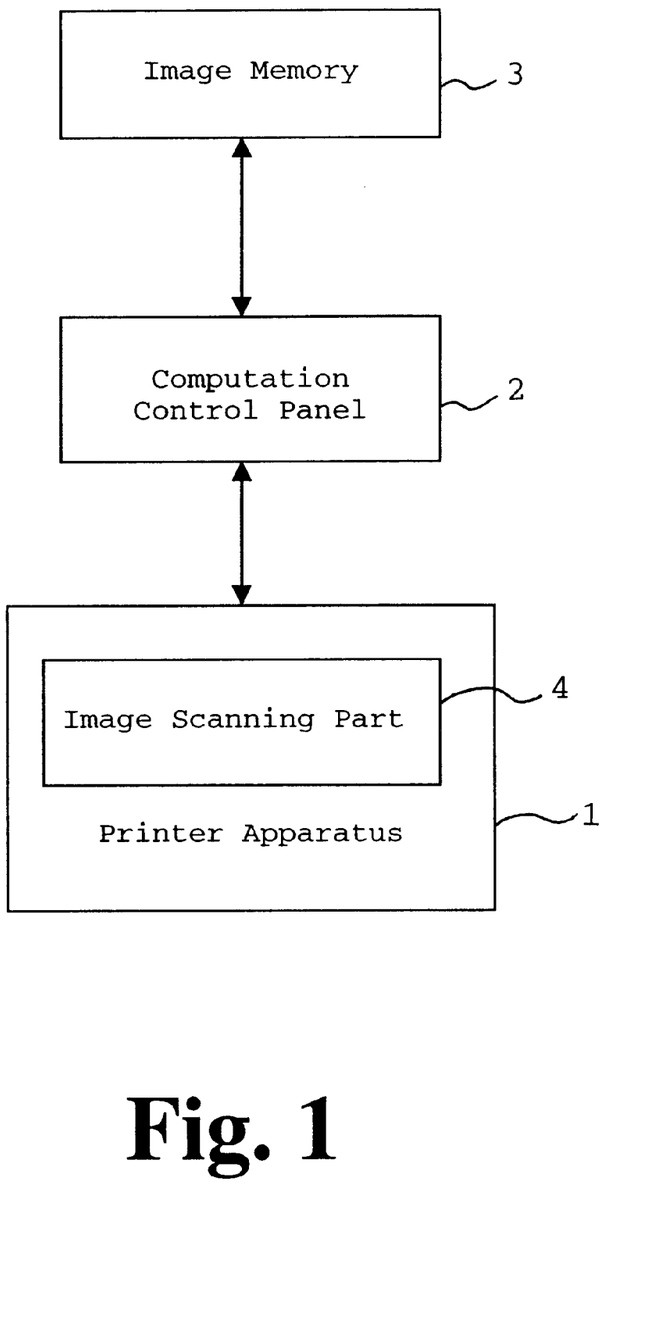
FIG. 1 is a block diagram showing one embodiment of a picture frame decision apparatus according to the present invention.

FIG. 1 is a block diagram showing an embodiment of a picture frame decision apparatus of the present invention. The picture frame decision apparatus of this embodiment comprises a printer apparatus 1, a computation control part 2 and an image memory 3.

The printer apparatus 1 sequentially transfers each picture frame of a film into a printing sheet, develops it and discharges the printing sheet with the projected images thereon. An image scanning part 4 is built in this printer apparatus. This image scanning part 4 scans, for example, a film with a CCD (charge-coupled device), forms image data indicative of an image on the film from the output of the CCD, and outputs this image data to the computation control part 2.

The computation control part 2 inputs the image data from the image scanning part 4, temporarily memorizes this image data in the image memory 3, and then based on the image data, decides whether a panoramic image is photographed or not on each picture frame. The computational control part 2 then informs the results of these decisions to the printer apparatus 1.

The printer apparatus 1 prints each picture frame of the film, that has been decided to be a panoramic image by the computation control part 2, to the printing sheet, extending it to the proper panoramic size. On the other hand, the printer apparatus 1 can print each picture frame of the film, that has not been decided to be a panoramic image by the computation control part 2, to the printing sheet, extending it to a normal size. The printer apparatus 1 then discharges the printing sheet with each image projected thereon.

The computation control part 2 decides whether a panoramic image is photographed in each picture frame of the film based on the image data stored in the image memory 3 according to the following process.

Figure 2:
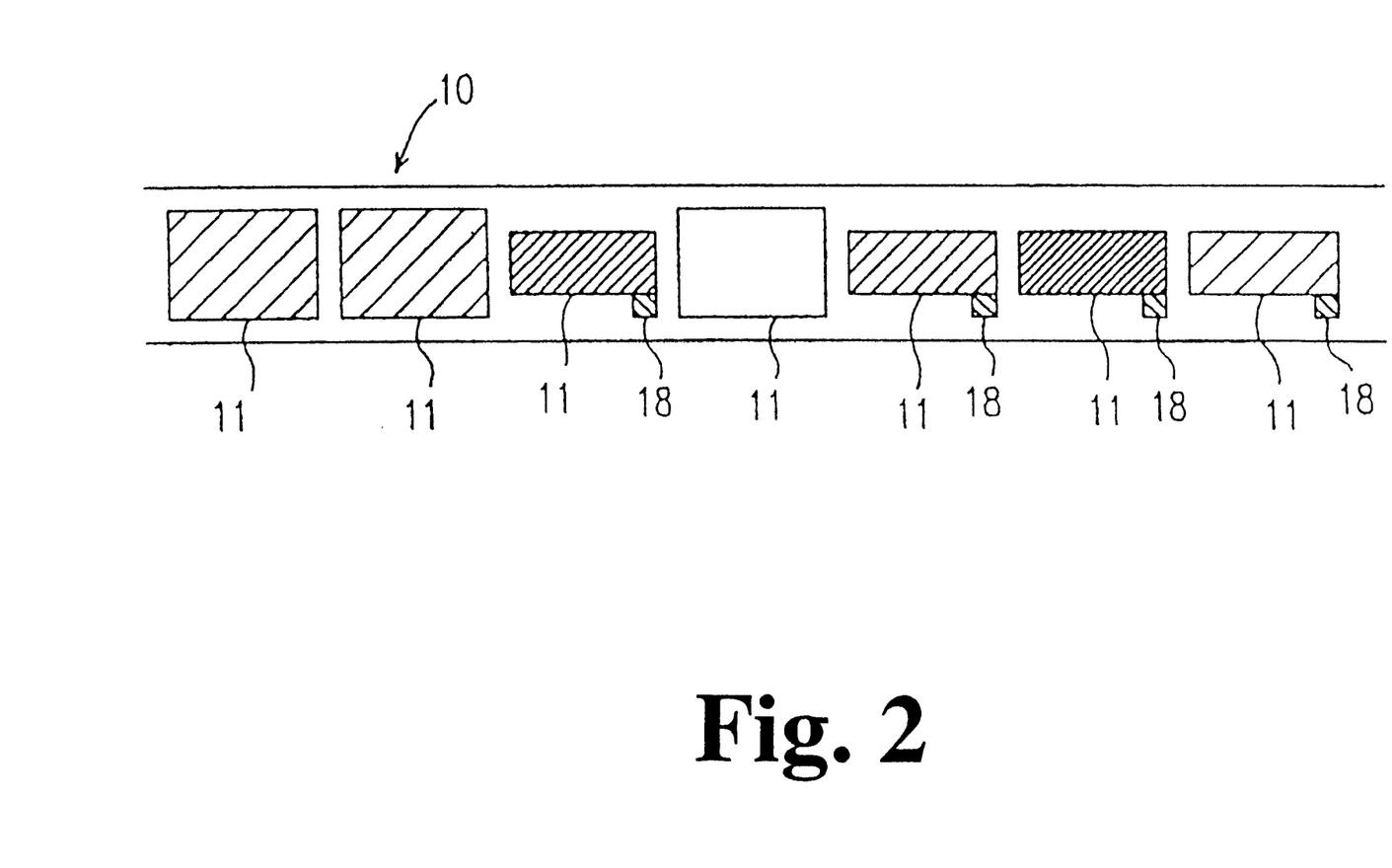
FIG. 2 is a diagram showing an example of each picture frame on the film.
Figure 3:
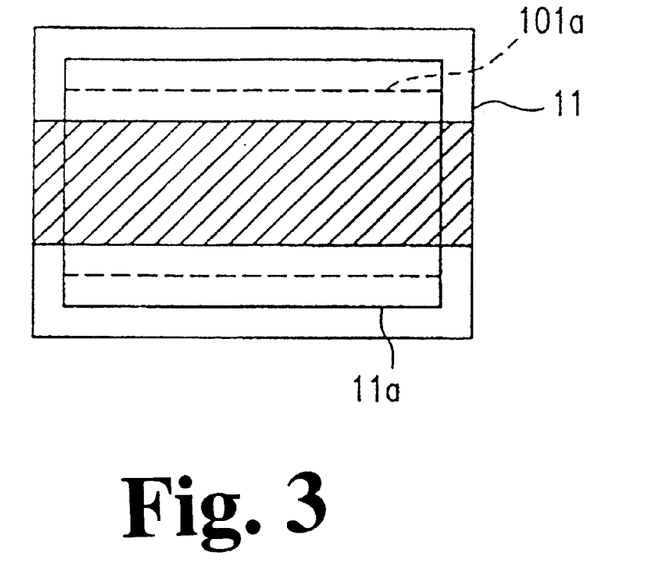
FIG. 3 is a diagram showing one picture frame on the film of FIG. 2.
Figure 4:
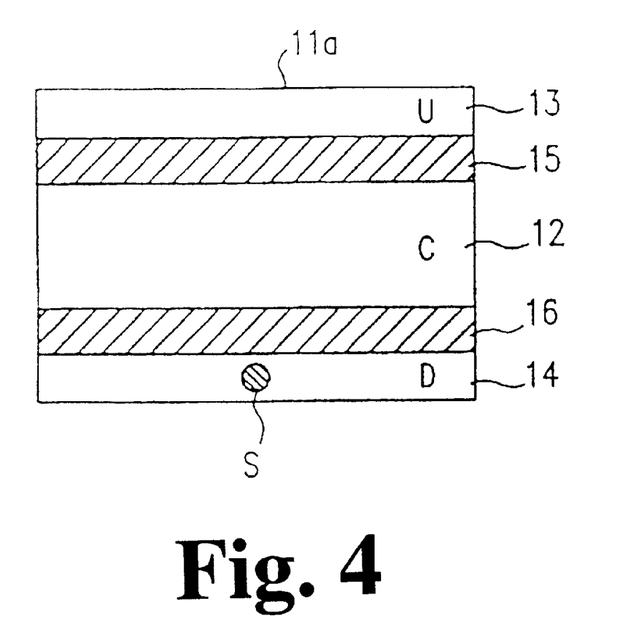
FIG. 4 is a diagram showing an image part extracted from the picture frame of FIG. 3.

First, the computation control part 2 determines or cuts out an image part 11a from a picture frame 11 as shown in FIG. 3. This is done for each picture frame 11 of a film 10 as shown in FIG. 2. The computational control part 2 further sections the image part 11a into a panoramic area 12, panoramic naturally through areas 13, 14 and dead zones 15, 16 as shown in FIG. 4.

Then the computation control part 2 extracts the panoramic area 12, adds the density of each pixel in this panoramic area 12, divides the sum with the number of pixels and determines the quotient as an average image density of the panoramic area 12.

Also, the computation control part 2 extracts the two panoramic naturally through areas 13 and 14 on both sides of the panoramic area 12, adds the density of each pixel in the panoramic naturally through area at every one of these panoramic naturally through areas 13 and 14, divides the sum with the number of pixels and determines the quotient. These quotients are determined as an average density U and D of each of the panoramic naturally through areas 13 and 14.

Further, the computation control part 2 scans each pixel of the entire film 10 based on the image data in the image memory 3, searches for a pixel P with the minimum density (i.e. lightest density), substitutes the minimum density P of this pixel for the following equation (1) and determines a standard density of the film 10.

$$B = P \times \alpha \qquad (1)$$

This $\alpha$ is usually set to a value less than 1.

Herein, between the panoramic area 12 and each of the panoramic naturally through areas 13 and 14, each of dead zones 15 and 16 is arranged. These dead zones 15 and 16 are areas not subjected to the density determinations. Therefore, longitudinal breadth of the panoramic image should be within a range defined by the dead zones 15 and 16. Thereby it can be accurately decided whether various sizes of panoramic images are photographed.

Also, concerning the size of the image part 11a shown in FIG. 3, extracting it so that it has same size especially in the longitudinal breadth direction leads to an accurate decision as to whether a panoramic image is photographed.

After having thereby determined the average image density C of the panoramic area 12, the average densities U and D of the naturally through areas 13 and 14 and the base density B of the film 10 at every one of the picture frames 11, it is then decided whether the following three conditions are satisfied.

Condition A: A ratio of the average density U and D of the naturally through areas 13 and 14 satisfies the following equation (2). In other words, variation between the average density U and D of the naturally through areas 13 and 14 is small.

$$U/D \cong 1 \qquad (2)$$

Condition B: The average image density C of the panoramic area 12 and the average density U and D of the panoramic naturally through areas 13 and 14 satisfy the following equation (3). In other words, an image is photographed in the panoramic area 12.

$$(U+D)/2 > C \qquad (3)$$

Condition C: An average value A of the average density of the panoramic naturally through areas 13, 14 and the base density B of the film 10 satisfy the following equation (4). In other words, the panoramic naturally through areas 13, 14 are sufficiently light.

$$A > B \qquad (4)$$

If these three conditions are satisfied, the computation control part 2 temporarily considers that a panoramic image has been photographed.

As described above, if the picture frame 11 is wholly light due to the under expose to the picture frame 11 of the film or if the image "s" photographed in the panoramic naturally through areas 13 and 14 is extremely small, the average density U and D of the panoramic naturally through areas 13 and 14 is sufficiently small. In this case, even though a panoramic image is not photographed, the above three conditions may be satisfied and the control part may decide that a panoramic image is formed in the picture frame 11 of the film.

Then, in this embodiment, by adding another condition D expressed by the following equations (5) and (6) to the above three conditions A, B and C, an accurate decision can be made whether the panoramic image is formed in the picture frame 11 of the film.

Condition D: A difference between maximum density Umax and minimum density Umin at the panoramic naturally through area 13 satisfies the following equation (5) and a difference between maximum density Dmax and minimum density Dmin at the panoramic naturally through area 14 satisfies the following equation (6).

$$U\max \approx U\min \quad (5)$$

$$D\max \approx D\min \quad (6)$$

The above equations (5) and (6) are for confirming that the difference between the maximum density Umax and the minimum density Umin at the panoramic naturally through area 13 is sufficiently small and the maximum density Dmax and the minimum density Dmin at the panoramic naturally through area 14 is also sufficiently small. If these equations (5) and (6) are satisfied, then it can be decided that the small image "s" is not properly photographed in the panoramic naturally through areas 13 and 14 and a panoramic image is formed in the picture frame 11.

On the other hand, if any one of these equations (5) and (6) is not satisfied, an image is photographed in at least one of the panoramic naturally through areas 13 and 14. Thus it is decided that a panoramic image is not formed but rather a normal size image is photographed.

Also, there are various types of photographic cameras and it can happen that a date or another mark can be photographed in a particular spot of at least one of the panoramic naturally through areas 13 and 14. For example, it happens that marks 18 can be formed in the same spots in the picture frames 11 such as are shown in FIG. 2.

In this case, although the small image "s" is not photographed in any of the panoramic naturally through areas 13 and 14, if it is falsely considered that the marks 18 are an image, at least one of the above equations (5) and (6) may not be satisfied. If this happens, it can be decided that a panoramic image is not formed in the picture frame 11.

For avoiding such a false conclusion, prior to deciding the results of the above equations (5) and (6), the mark 18 is excluded from each one of the picture frames 11 which satisfy the above conditions A, B and C and to which the panoramic image has been temporarily considered to be photographed thereon.

For excluding this mark 18, the computation control part 2 initially identifies whether a plurality of picture frames 11 to which the panoramic image has been temporarily considered to be photographed thereon has a spot or region with a predetermined density at a common location.

For example, the computation control part 2 selects each pixel in the common location of the picture frames 11 to which the panoramic image has been temporarily considered to be photographed, integrates the density of these pixels and determines a total density of their sum. It repeats this computation for every pixel in each one of the locations and determines a total density of pixels in each one of the locations. Because the mark 18 of each of the picture frames 11 has a different density from that around the mark 18, comparisons of the total density of pixels at these locations with a predetermined threshold result in that the total density of pixels at each location included by the mark 18 exceeds the predetermined threshold and allows identification of pixels at each location included by the mark 18.

Having identified each pixel included in the mark 18, the computation control part 2 excludes each pixel of the mark 18 from each picture frame 11 to which the panoramic image has been temporarily considered to be photographed and then forms each picture frame 11 as not including the mark 18.

After this, the computation control part 2 determines whether the equations (5) and (6) of the above condition D are satisfied at every picture frame 11 to which the panoramic image has been temporarily considered to be photographed and where the mark 18 has been excluded. If the equations (5) and (6) are satisfied, it is decided that the panoramic image is formed in the picture frame 11 because the small image "s" is not photographed on any of the panoramic naturally through areas 13 and 14.

In another embodiment, in addition to the computation of the condition D with the picture frame 11 not including the mark 18, etc., secondary computations of any one or all of the conditions A, B and C can be made using the picture frame not including the mark 18, etc. This leads to a more accurate decision related to the picture frame, because it uses the more accurate picture frame information.

As explained above, it can be more accurately decided whether a panoramic image is formed in the picture frame 11, by adding condition D to the above conditions A, B and C, i.e. the condition for deciding whether the small image "s" is not photographed in any of the panoramic naturally through areas 13 and 14.

Also, the decision related to the condition D is not a false determination because the date or any other mark photographed in a particular spot or region of the panoramic naturally through areas 13 and 14 can be excluded from the picture frame.

Further, this invention is not intended to be limited to the above embodiment and various modifications can be made. For example, each numerical value at the above conditions A, B, C and D can be altered appropriately. Also to identify whether every one of the picture frames 11 has the spot or region with a predetermined density at a common location on the picture frames, a different method from the above described method can be used. For example, detecting a pixel with a density exceeding a threshold from pixels in the panoramic naturally thorough areas 13, 14, may be done by deciding that this pixel is the spot of a predetermined density at a common location on the picture frames, if this pixel always appears in the same location in a plurality of the picture frames 11.

It is to be understood that although the present invention has been described with regard to preferred embodiments thereof, various other embodiments and variants may occur to those skilled in the art, which are within the scope and sprit of the invention, and such other embodiments and variants are intended to be covered by the following claims.

The text of Japanese priority application number 10-150325 filed May 29, 1998 is incorporated herein by reference.

What is claimed is:

1. A picture frame decision apparatus comprising:
   identification means for identifying whether a plurality of picture frames of a film have a region with a predetermined density in a common location relative to each picture frame of the plurality of picture frames;
   computation means for determining a density of each of the plurality of picture frames while excluding the region with the predetermined density in the common location relative to each picture frame of the plurality of picture frames;

sectioning means for sectioning at least one picture frame into two naturally through areas and a panoramic area located therebetween;

decision means for deciding whether a panoramic image is formed in the at least one picture frame;

wherein said computation means determines an average density of each of the naturally through areas while excluding the region with the predetermined density from each of the naturally through areas when the plurality of picture frames of the film have the region with the predetermined density at the common location relative to each picture frame of the plurality of picture frames, wherein said decision means decides based on a comparison of the average density of the naturally through areas;

wherein said computation means determines a difference between a maximum density and a minimum density in each of the naturally through areas of the at least one picture frame, and wherein said decision means decides whether the panoramic image is formed based on a comparison of the average density of the naturally through areas and a comparison between a difference of each of the naturally through areas and a predetermined value.

2. A picture frame decision apparatus comprising:

identification means for identifying whether a plurality of picture frames of a film have a region with a predetermined density in a common location relative to each picture frame of the plurality of picture frames;

computation means for determining a density of each of the plurality of picture frames while excluding the region with the predetermined density in the common location relative to each picture frame of the plurality of picture frames;

sectioning means for sectioning at least one picture frame into two naturally through areas and a panoramic area located therebetween;

decision means for deciding whether a panoramic image is formed in the at least one picture frame;

wherein said computation means determines an average density of the panoramic image and an average density of each of the naturally through areas while excluding the region with the predetermined density from each of the naturally through areas when the plurality of picture frames of the film have the region with the predetermined density at the common location relative to each picture frame of the plurality of picture frames;

wherein said decision means decides based on a comparison of the average density of the naturally through areas and the average density of the panoramic area;

wherein said computation means determines a difference between a maximum density and a minimum density at each of the naturally through areas of the at least one picture frame, and wherein said decision means decides whether the panoramic image is formed based on a comparison of the average density of the naturally through areas and a comparison between a difference of each of the naturally through areas and a predetermined value.

3. A picture frame decision apparatus comprising:

identification means for identifying whether a plurality of picture frames of a film have a region with a predetermined density in a common location relative to each picture frame of the plurality of picture frames;

computation means for determining a density of each of the plurality of picture frames while excluding the region with the predetermined density in the common location relative to each picture frame of the plurality of picture frames;

sectioning means for sectioning at least one picture frame into two naturally through areas and a panoramic area located therebetween;

decision means for deciding whether a panoramic image is formed in the at least one picture frame;

wherein said computation means determines a base density of the film, determines a standard density less than the base density with a predetermined ratio and determines an average density of each of the naturally through areas while excluding the region with the predetermined density from each of the naturally through areas when the plurality of picture frames of the film have the region with the predetermined density at the common location relative to each picture frame of the plurality of picture frames, wherein said decision means decides based on a comparison between the standard density and the average density of the naturally through areas;

wherein said computation means determines a difference between a maximum density and a minimum density at each naturally through area of the at least one picture frame, and wherein said decision means decides whether the panoramic image is formed based on a comparison of the average density of the naturally through areas and a comparison between the difference of each of the naturally through areas and a predetermined value.

4. A picture frame decision apparatus comprising:

identification means for identifying whether a plurality of picture frames of a film have a region with a predetermined density in a common location relative to each picture frame of the plurality of picture frames;

computation means for determining a density of each of the plurality of picture frames while excluding the region with the predetermined density in the common location relative to each picture frame of the plurality of picture frames;

sectioning means for sectioning at least one picture frame into two naturally through areas and a panoramic area located therebetween; and decision means for deciding whether a panoramic image is formed in the at least one picture frame;

wherein said computation means determines a base density of the film, determines a standard density less than the base density with a predetermined ratio, determines an average density of the panoramic area and determines an average density of each of the naturally through areas while excluding the region with the predetermined density from each of the naturally through areas when the plurality of picture frames of the film have the region with the predetermined density at the common location relative to each picture frame of the plurality of picture frames, and wherein said decision means decides based on a comparison between the standard density and the average density of each of the naturally through areas and on a comparison between the average density of the panoramic area and the average density of each naturally through area.

5. The picture frame decision apparatus as defined in claim 4, wherein said computation means determines a difference between a maximum density and a minimum density at each naturally through area of the at least one picture frame, and wherein said decision means decides whether the panoramic image is formed based on a comparison of the average density of the naturally through areas and a comparison between the difference of each of the naturally through areas and a predetermined value.

6. A picture frame decision method comprising:

identifying whether a plurality of picture frames of a film have a region with a predetermined density in a common location relative to each picture frame of the plurality of picture frames;

determining a density of each of the picture frames while excluding the region with the predetermined density in the common location relative to each picture frame of the plurality of picture frames;

sectioning at least one picture frame into two naturally through areas and a panoramic area located therebetween;

deciding whether a panoramic image is formed in the at least one picture frame;

wherein said step of determining the density includes determining an average density of each of the naturally through areas while excluding the region with the predetermined density from each of the naturally through areas when the plurality of picture frames of the film have the region with the predetermined density at the common location relative to each picture frame of the plurality of picture frames, wherein said step of deciding whether a panoramic image is formed includes comparing the average density of each of the naturally through areas;

wherein said step of determining the density includes determining a difference between a maximum density and a minimum density at each of the naturally through areas of the at least one picture frame, and wherein said step of deciding whether the panoramic image is formed includes comparing the average density of naturally through areas and comparing the difference of each of the naturally through areas and a predetermined value.

7. A picture frame decision method comprising:

identifying whether a plurality of picture frames of a film have a region with a predetermined density in a common location relative to each picture frame of the plurality of picture frames;

determining a density of each of the picture frames while excluding the region with the predetermined density in the common location relative to each picture frame of the plurality of picture frames;

sectioning at least one picture frame into two naturally through areas and a panoramic area located therebetween;

deciding whether a panoramic image is formed in the at least one picture frame;

wherein said step of determining the density includes determining an average density of the panoramic image and an average density of each of the naturally through areas while excluding the region with the predetermined density from each of the naturally through areas when the plurality of picture frames of the film have the region with the predetermined density at the common location relative to each picture frame of the plurality of picture frames;

wherein said step of deciding whether a panoramic image is formed includes comparing the average density of the naturally through areas and the average density of the panoramic area;

wherein said step of determining the density includes determining a difference between a maximum density and a minimum density at each of the naturally through areas of the at least one picture frame, and wherein said step of deciding whether the panoramic image is formed includes comparing the average density of the naturally through areas and a comparing a difference of each of the naturally through areas and a predetermined value.

8. A picture frame decision method comprising:

identifying whether a plurality of picture frames of a film have a region with a predetermined density in a common location relative to each picture frame of the plurality of picture frames;

determining a density of each of the picture frames while excluding the region with the predetermined density in the common location relative to each picture frame of the plurality of picture frames;

sectioning at least one picture frame into two naturally through areas and a panoramic area located therebetween;

deciding whether a panoramic image is formed in the at least one picture frame;

wherein said step of determining the density includes determining a base density of the film, determining a standard density less than the base density with a predetermined ratio and determining an average density of each of the naturally through areas while excluding the region with a predetermined density from each of the naturally through areas when the plurality of picture frames of the film have the region with the predetermined density at the common location relative to each picture frame of the plurality of picture frames, wherein said step of deciding whether a panoramic image is formed includes comparing the standard density and the average density of the naturally through areas;

wherein said step of determining the density of each of the picture frames includes determining a difference between a maximum density and a minimum density at each of the naturally through areas of the at least one picture frame, and wherein said step of deciding whether a panoramic image is formed includes comparing the average density of the naturally through areas and comparing the difference of each of the naturally through area and a predetermined value.

9. A picture frame decision method comprising:

identifying whether a plurality of picture frames of a film have a region with a predetermined density in a common location relative to each picture frame of the plurality of picture frames;

determining a density of each of the picture frames while excluding the region with the predetermined density in the common location relative to each picture frame of the plurality of picture frames;

sectioning at least one picture frame into two naturally through areas and a panoramic area located therebetween; and deciding whether a panoramic image is formed in the at least one picture frame;

wherein said step of determining the density includes determining a base density of the film, determining a standard density less than the base density with a predetermined ratio, determining an average density of the panoramic area and determining an average density of each of the naturally through areas while excluding the region with a predetermined density from each of the naturally through areas when the plurality of picture frames of the film have the region with the predetermined density at the common location relative to each picture frame of the plurality of picture frames, and wherein said step of deciding whether a panoramic image is formed includes comparing the standard density and the average density of the naturally through areas and comparing the average density of the panoramic area and the average density of each of the naturally through areas.

10. The picture frame decision method as defined in claim 9, wherein said step of determining a density of each of the picture frames includes determining a difference between a maximum density and a minimum density at each of the naturally through areas of the at least one picture frame, and wherein said step of deciding whether a panoramic image is formed includes comparing the average density of the naturally through areas and comparing the difference of each of the naturally through areas and a predetermined value.

* * * * *